United States Patent [19]

Odar

[11] 4,224,426

[45] Sep. 23, 1980

[54] POLYMERIZATION PROCESS FOR CIS-1,4-POLYBUTADIENE USING CYCLOALKANE SOLVENTS AND AN AROMATIC POLYMERIZATION REGULATOR

[75] Inventor: Joseph Odar, South Euclid, Ohio

[73] Assignee: The B. F. Goodrich Company, Akron, Ohio

[21] Appl. No.: 960,388

[22] Filed: Nov. 13, 1978

[51] Int. Cl.$^2$ ............................................. C08F 36/06
[52] U.S. Cl. ...................................... 526/92; 526/335
[58] Field of Search ................................. 526/335, 92

[56] References Cited

U.S. PATENT DOCUMENTS

| | | |
|---|---|---|
| 2,999,089 | 9/1961 | Short et al. |
| 3,046,265 | 7/1962 | Hazen et al. |
| 3,094,514 | 6/1963 | Tucker |
| 3,135,725 | 6/1964 | Carlson et al. |
| 3,222,347 | 12/1965 | Farrar et al. |
| 3,222,348 | 12/1965 | Duck |
| 3,284,431 | 11/1966 | Gippin |
| 3,331,826 | 7/1967 | Talcott ................................. 526/335 |
| 3,646,001 | 2/1972 | Lasis et al. |
| 3,928,303 | 12/1975 | Yasui et al. ......................... 526/335 |

FOREIGN PATENT DOCUMENTS

| | | |
|---|---|---|
| 924427 | 4/1963 | United Kingdom . |
| 926036 | 5/1963 | United Kingdom . |

*Primary Examiner*—Harry Wong, Jr.
*Attorney, Agent, or Firm*—Nestor W. Shust

[57] ABSTRACT

Substantially gel-free cis-1,4-polybutadiene is produced by polymerizing butadiene in the presence of a catalyst comprising a mixture of a cobalt compound, at least one organoaluminum compound and water, the improvement being the use of a cycloalkane having 5 to 8 carbon atoms in the ring and from 0.1 to 2 percent of an alkyl substituted benzene as a polymerization regulator.

12 Claims, No Drawings

POLYMERIZATION PROCESS FOR CIS-1,4-POLYBUTADIENE USING CYCLOALKANE SOLVENTS AND AN AROMATIC POLYMERIZATION REGULATOR

BACKGROUND OF THE INVENTION

Polymerization of conjugated dienes, especially butadiene-1,3, is well known in the art using a variety of catalysts and a variety of solvents. Thus U.S. Pat. No. 3,135,725 discloses cobalt salt-hydrocarbyl aluminum catalysts and U.S. Pat. No. 3,046,265 discloses alkyl aluminum, cobalt halide and acetyl halide catalysts, both employing a variety of diluents including aliphatic, cycloaliphatic and aromatic hydrocarbons. U.S. Pat. Nos. 3,094,514 and 3,646,001 even suggest the use of a mixture of aliphatic and aromatic hydrocarbons but clearly stating that the mixture must contain at least 15% by weight of an aromatic solvent. The former patent notes that the presence of the aromatic hydrocarbon produces somewhat faster reactions.

Although generally the order of addition of the reactants and the catalysts apparently was not considered to be of critical importance, various patents disclose different orders of addition. Thus in British Pat. No. 926,036 the reactants and catalysts were added in the order of a solvent, an aluminum compound, cobalt chloride in pyridine and finally butadiene while in British Pat. No. 924,427 the order was: an aromatic solvent, cobalt and then aluminum compounds as catalysts, an additional aromatic solvent, an aliphatic solvent and finally butadiene. U.S. Pat. No. 3,284,431 discloses adding to the reaction vessel an aromatic solvent, butadiene, an aluminum compound catalyst, an activator and finally a cobalt compound catalyst. Another order of addition is disclosed in U.S. Pat. No. 3,646,001 where cobalt and aluminum catalysts, such as cobalt octoate and diethyl aluminum chloride, are prereacted in wet benzene at a temperature below 20° C. and then are added butadiene and additional solvents such as benzene and butene-1. Published Japanese patent application SHO-44-10276 discloses dissolving a cobalt catalyst in dry toluene, feeding butadiene-1,3 to the reaction vessel and then adding an aluminum catalyst to begin polymerization.

As a rule the most preferred solvent for butadiene polymerization has been benzene. However, from the point of view of health safety, benzene is an undesirable material as evidenced by recent severe restrictions placed by the Occupational Safety and Health Agency (OSHA) on the concentration of benzene permissible in the work area. For this reason it is imperative to find a solvent or solvent combinations for butadiene polymerizations that would yield cis-1,4-polybutadiene having the same or better properties than those of polybutadiene prepared in benzene.

The difficulty with most solvents is, however, that the polymerization rate is too fast making the reaction practically uncontrollable, or it is too slow and therefore not economically feasible. The initial rate of conversion (polymerization) of the monomer is of critical importance since a difference of only a few percentage points may make the difference between having a controllable and an uncontrollable polymerization. Furthermore, if the polymer is formed at a certain polymerization rate it will not have the required desirable properties.

SUMMARY OF THE INVENTION

The polymerization of butadiene-1,3 is carried out in the presence of a catalyst comprising a mixture of cobalt compound, an organoaluminum compound and water. The present invention deals with the improvement in the process of butadiene polymerization the improvement being the use as a solvent a cycloaliphatic hydrocarbon and from 0.1 to 2% by weight of an alkyl substituted benzene to produce substantially linear gel-free cis-1,4-polybutadiene.

DETAILED DISCLOSURE

This invention is directed to an improved process of polymerizing butadiene-1,3 to produce primarily linear, gel-free cis-1,4-polybutadiene. More specifically, the improved process is carried out in the presence of a catalyst comprising a mixture of a cobalt compound, at least one organoaluminum compound and water, the improvement which comprises using as a solvent a cycloalkane having 5 to 8 carbon atoms in the ring and from 0.1 to 2 percent, based on the weight of cycloalkane, of an alkyl substituted benzene as a polymerization regulator.

It was unexpectedly found that when a cycloalkane was used as the chief solvent in the polymerization of butadiene, the polymerization proceeded at too fast a rate as a result of which it was difficult to control the polymerization temperature. The resulting cis-polybutadiene possessed a higher degree of vinyl content and did not possess the desired physical properties. It was also unexpectedly found that a small amount of an alkyl substituted benzene substantially slowed down the initial rate of polymerization so that it could be easily controlled. This was unexpected since prior art taught that butadiene polymerization proceeds faster in an aromatic solvent than in a non-aromatic solvent (e.g. U.S. Pat. No. 3,094,514). Thus the present invention is an improved process of butadiene-1,3 polymerization employing a cycloalkane solvent and from 0.1 to 2 percent by weight of an alkyl substituted benzene as a polymerization regulator. Therefore the process of the present invention successfully eliminates the need for benzene yet yields substantially linear, gel-free cis-1,4-polybutadiene having good physical properties.

Cycloalkanes useful in the process are those having 5 to 8 carbon atoms in the rings. They also include methyl and ethyl substituted cycloalkanes. Illustrative examples of cycloalkanes are cyclopentane, cyclohexane, cycloheptane, cyclooctane, methylcyclopentane, methylcyclohexane, methylcycloheptane, methylcyclooctane, dimethylcyclopentane, dimethylcyclohexane, dimethylcycloheptane, ethylcyclopentane, ethylcyclohexane, ethylcyclooctane and the like. Preferred are unsubstituted and methyl substituted cycloalkanes. Most preferred, for economic reasons, is cyclohexane.

The second critical component of the improved process, a polymerization regulator, is a lower alkyl substituted benzene having 1 to 4 alkyl substituents of 1 to 4 carbon atoms. Preferably there are 2 or 3 methyl or ethyl substituents. Illustrative examples of the useful alkyl substituted benzenes are toluene, o, m or p-xylene or a mixture of xylene isomers, 1,3,5-trimethylbenzene (mesitylene) and other isomers of trimethylbenzene, or a mixture thereof, 1,2,4,5-tetramethylbenzene (durene) and other isomers of tetramethylbenzene, or a mixture thereof, ethylbenzene, 1,2-, 1,3- or 1,4-diethylbenzene, or a mixture of said isomers, n-propylbenzene, 1,4-n- dipropylbenzene, n-butylbenzene and the like, or a mixture of various alkyl substituted benzenes. Preferred are various xylene isomers or a mixture thereof, various diethylbenzene isomers or a mixture thereof and mesitylene. The alkyl substituted benzene is used in the amount of from 0.1 to 1 percent by weight of the total charge, and preferably from 0.2 to 0.7 percent by weight.

One of the purposes of a solvent in this process is to control the polymerization temperature by refluxing the solvent. Often the desired temperature control is difficult to accomplish with only one solvent. However, by selecting two or more solvents which have certain desirable boiling points, the polymerization temperature can be relatively easily controlled. Therefore, the selection of the secondary solvent will depend primarily on its boiling point and the temperature that is to be maintained during polymerization. Thus by "solvent" is meant either a cycloalkane solvent or a mixture of two or more solvents. In any event the monomer and the resulting polymer should be substantially soluble in the solvent. Useful secondary solvents are saturated aliphatic hydrocarbons such as hexane, heptane, octane, and the like; α-monoolefins having 2 to 10 carbons such as butene-1, pentene-1, hexene-1, and the like. Various ISOPAR solvents (sold by EXXON) are also found to be useful. They are a mixture of isoparaffinic hydrocarbon fractions boiling at certain temperature ranges. For example, ISOPAR C is primarily 2,2,4-trimethylpentane and other trimethyl pentane isomers. This mixture boils at a range of approximately 206°–220° F. (96.7°–104° C.). The preferred secondary solvents are α-monoolefins, especially butene-1. The secondary solvent may be used in an amount 0 percent to 80 percent by weight of the cycloalkane solvent, and more preferably from 20 to 50 percent.

If desired, a molecular weight modifier may be employed in the process of this invention in order to control the molecular weight of the product. The molecular weight may be controlled by the monomer concentration, the catalyst concentration and the ratio of the two catalyst components. However, it may be more convenient or more economical to employ a molecular weight modifier. Illustrative examples of particularly useful molecular weight modifiers are non-conjugated dienes having 2 to 18 carbon atoms such as 1,2-butadiene, 1,4- and 1,5-hexadiene and the like; cyclic dienes having 6 to 12 carbon atoms such as 1,4-cyclohexadiene and 1,2 and 1,5-cyclooctadiene and the like. The molecular weight modifier is generally used in the amount of from 0.1 to 2 percent by weight of the cycloalkane, and more preferably from 0.2 to 0.5 percent.

The catalysts that are employed in butadiene polymerizations are well known in the art. Various cobalt and aluminum compounds which are useful as catalysts are disclosed in the patents and published patent applications mentioned above as well as U.S. Pat. Nos. 3,094,595 and 3,222,348, British Pat. Nos. 849,589; 995,957 and 1,042,172 and German Pat. Nos. 1,144,922; 1,199,992 and 1,495,935.

The cobalt compound can be any organic compound such as the cobalt salts of organic acids, cobalt complexes and the like, since the cobalt compound preferably should be soluble in the solvent or the monomer. Typical of such solvent or monomer soluble cobalt compounds are cobalt octoate, cobalt sorbate, cobalt adipate, cobalt 2-ethylhexoate, cobalt stearate, cobalt acetylacetonate and the like compounds wherein the organic portion of the molecule contains about 5 to 20, preferably 8 to 18 carbon atoms and one or two carboxylic functions, as well as acetylacetonate, as are well known to those skilled in the art.

The other essential catalyst component is an alkyl aluminum halide which can be used as a mono- or dialkyl aluminum halide, a mixture thereof, or a mixture of $R_3Al$, $R_2AlX$, $RAlX_2$ or $AlX_3$ type compounds wherein R is an alkyl and X is halogen, more preferably, the chloride. The alkyl groups normally contain 1 to 12 carbon atoms, more preferably, about 2 to 8 carbon atoms. Particularly useful are dialkyl aluminum chlorides wherein the alkyl contains 2 to 6 carbon atoms, and the so-called sesquichloride which is a mixture of aluminum trichloride and trialkyl aluminum, normally having a composition of about $R_{1.5-1.9}AlX_{1.6-1.1}$.

Typical catalyst combinations are cobalt II octoate+$Et_{1.66}AlCl_{1.33}$; cobalt II ethylhexoate+$Et_{1.33}AlCl_{1.67}$; cobalt octoate+$Et_2AlCl$+$H_2O$; cobaltacetylacetonate+$AlHCl_2$-ether; cobalt-3-acetylacetonate+$Et_3Al_2Cl_3$+ethyl acetate; cobalt diacetylacetonate+$Et_2AlCl$; cobalt stearate+$Et_2AlCl$; cobalt acetylacetonate−$Et_2AlCl$; cobalt octoate$AlCl_3$-$SnEtH$, and the like. These catalyst components are well known and clearly defined in the patent literature, including the molar ratio of cobalt to aluminum and the amounts of catalyst components used. It is normally preferred to operate in the range of aluminum to cobalt ratios between about 50:1 and 800:1. The amounts of catalyst used based on cobalt will be at least about 0.0005 millimol per 100 grams of butadiene up to about 5 to 10 millimols of cobalt per 100 grams. Normally, it is preferred to use from about 0.005 to about 0.5 millimols of cobalt per 100 grams of monomer. The concentration of aluminum can vary from as low as about 0.5 millimols to about 10 millimols or more per 100 grams of monomer, preferably about 1 to 4 millimoles. This generally means that less than about 2% by weight of total catalyst will be used. A preferred aluminum to cobalt ratio is from about 50 to about 300, and more preferably about 100 to 200. Trace amounts of water are also a useful component of the polymerization recipe, normally added either in the solvents or monomers. The water to aluminum ratio often used is from about 0.1 to about 0.7 but ratios as low as 0.05 to as high as 0.9 are contemplated.

The catalyst components may be added in any order to the polymerization mixture or they may be premixed if desired. Solvents and/or monomer may be present during the addition of catalyst. Agitation is beneficial to obtain good heat transfer and diffusion of monomers. Batch and continuous polymerizations may be employed. It is understood, of course, that other than the catalyst water added to the polymerization, precautions are normally taken to exclude moisture and air, particularly oxygen and oxygen-containing materials. Moisture is normally controlled to the desired amount by use of dry reactants and maintaining an inert dry atmosphere over the polymerization materials including charging procedures.

In conducting polymerizations according to the disclosures of the above patents and known to those skilled in the art, a variety of polymerization procedures may be followed. One useful method is to charge the solvents and the monomer and then the catalyst components. The polymerization may be conducted within a temperature range of from −35° C. up to about 100° C. Normally the polymerization is conducted between −10° C. to about 35° C., and preferably between 5° and 35° C. A pressure autoclave may be employed and the pressure of the system, if any, at this temperature normally is observed.

The improvement of this invention is particularly effective when it is employed in combination with further improvements concerning the order of addition of the catalysts, the solvents and the monomer which is covered by my copending application Ser. No. 936,265. When the various features are combined, the result is an improved process of polymerizing butadiene-1,3 to produce primarily linear, gel-free cis-1,4-polybutadiene which is carried out in the presence of a catalyst comprising a mixture of a cobalt compound, at least one organoaluminum compound and water, the improvement which comprises (a) adding in any order to the polymerization vessel butadiene, catalyst water, a cobalt catalyst, a cycloalkane of 5 to 8 carbon atoms in the ring and from 0.1 to 2 percent by weight of cycloalkane of an alkyl substituted benzene, (b) thereafter adding an aluminum catalyst containing at least one aluminum compound, said catalyst having a chlorine to aluminum ratio of between 0.7:1 and 1.6:1;

said polymerization system containing an aluminum to cobalt ratio between 50:1 and 800:1 and a water to aluminum ratio between 0.1:1 and 0.8:1 and finally (c) polymerizing said butadiene-1,3 to a conversion of 30 to 90 percent producing gel-free cis-1,4-polybutadiene.

In the above improved process it is preferable that the ratio of aluminum to cobalt be in the range of 50:1 to 800:1 and more preferably 50:1 to 300:1; the ratio of chlorine to aluminum be in the range of 0.7:1 to 1.5:1 and the ratio of water to aluminum be in the range of 0.1:1 to 0.8:1 and more preferably 0.20:1 to 0.55:1.

In the preferred process the order of addition of the various materials to the reaction vessel is most critical. First the cobalt compound is pre-dissolved in an appropriate cycloalkane solvent. A convenient procedure is to first prepare a solution of a cobalt compound in a solvent such as cyclohexane the concentration of which is approximately 12 percent based on the cobalt (which solution is available commercially). Then the solution is diluted with either the same solvent or with alkyl substituted benzene or a mixture thereof to the concentration of 0.0063 millimole/cc. of the cobalt compound. Of course, the dilution could be made to a higher or a lower concentration if desired. An appropriate amount of the dilute solution of the cobalt catalyst is then placed into the reaction vessel to which is then added wet butadiene, the amount of water present being such that eventually the desired water to aluminum ratio will be established. Next an appropriate amount of dry butadiene-1,3 is added followed by the addition of a cycloalkane or a cycloalkane-alkyl substituted benzene mixture.

The most preferred modification of the present improved process is to dilute the cobalt catalyst solution with a solvent containing an alkyl substituted benzene, then to add to this solution in any order butadiene, water and a cycloalkane solvent; thereafter the aluminum component is added and the monomer is consequently polymerized.

A convenient procedure is to first prepare (or purchase) a solution of a cobalt compound having e.g. 12 percent cobalt concentration (or any desired concentration) in a solvent such as cyclohexane and then diluting this solution to a concentration of 0.0063 millimole/cc. (or any other desired concentration). An appropriate amount of the dilute solution of the cobalt catalyst is then placed into the reaction vessel to which is then added wet butadiene, the amount of water present being such that eventually the desired water to aluminum ratio will be established. Although it is less preferable to do so, it is possible to employ wet solvent in place of wet butadiene. Next an appropriate amount of dry butadiene-1,3 is added followed by the addition of a diluent which is a solvent for both the monomer and the polymer. By "solvent" is meant a specific solvent or a mixture of two or more solvents, the mixtures being preferred.

Conversion of butadiene-1,3 to cis-1,4-polybutadiene is in the range of from 30 to 90 percent, but the degree of conversion is dependent on the concentration of butadiene, total catalyst concentration, catalyst component ratios, nature of the solvent, time of reaction, temperature and possibly other factors.

After polymerization has reached the desired degree of conversion, the reaction is normally stopped with an agent that reacts with the catalyst, such as water and alcohol, carboxylic acid, acetone, amine and the like, to destroy the catalyst and convert it to an oxygen insensitive material. This step is normally carried out in the absence of air. It is also often desirable to treat the reaction mixture to remove the catalyst residues. This can be effected by water washes, alcohol washes and the like. The polymer may be simultaneously precipitated by the addition of alcohol or alcohol solvent mixtures that both destroy the catalyst and precipitate the polymer as a solid crumb which may be further washed with water or alcohol which is thereafter dried.

The following examples are presented to further illustrate the process of this invention.

EXAMPLES 1-33

The polymerizations summarized in TABLE I below have been carried out according to the following procedures. Butadiene-1,3 containing a specified amount of water was charged to a polymerization vessel followed by the addition of cobalt octoate dissolved in the indicated alkylated benzene having the concentration of 0.0063 m mole/cc (giving the indicated effective amount of cobalt octoate). Thereafter were added dry butadiene-1,3, followed by butene-1, followed by cyclooctadiene, followed by cyclohexane. Finally was added diethyl aluminum chloride in cyclohexane having the indicated concentration in m mole/cc. The polymerization was carried out at 20° C. and was continued for 90 minutes with percent conversion measured every 30 minutes. Then 5 ml. of ethanol was added while mixing to destroy the catalyst, followed by the addition of an antioxidant (2,6-di-t-butyl-p-cresol). The cis-1,4-polybutadiene was isolated by coagulating in ethanol.

The product had a very low gel content; % gel (millipore) being shown for every example. (Description of the procedure for the millipore gel content determination follows the table).

TABLE I

| | | | | Example No. | | | | |
|---|---|---|---|---|---|---|---|---|
| 1 | 2 | 3 | 4 | 5 | 6 | 7 | 8 | 9 |

TABLE I-continued

| | | | | | | | | | |
|---|---|---|---|---|---|---|---|---|---|
| Wet Butadiene (m Mole H₂O) | 14.2 g. (0.315) | → | → | 14.2 ml. (0.315) | → | → | 14.2 g. (0.315) | → | → |
| Co octoate (m Mole) | 1.25 ml. (0.0079) | → | → | 1.25 ml. (0.0079) | → | → | 1.25 ml. (0.0079) | → | → |
| Alkyl Benzene | None | → | → | 0.25% Toluene | → | → | 0.25% Ethyl benzene | → | → |
| Butadiene | 85.5 g. | → | → | 85.8 g. | → | → | 85.8 g. | → | → |
| Butene-1 | 108.0 g. | → | → | 100 g. | → | → | 100 g. | → | → |
| 1,5-COD$^{(1)}$ | 1.91 ml. | → | → | 2.00 ml. | → | → | 2.0 ml. | → | → |
| Cyclohexane | 226.0 g. | → | → | 234.0 g. | → | → | 234.0 g. | → | → |
| DEAC$^{(2)}$ (m Moles of Al) | 1.17 ml. (0.794) | → | → | 1.17 ml. (0.794) | → | → | 1.17 ml. (0.794) | → | → |
| Cl/Al ratio | 1.0 | → | → | 1.0 | → | → | 1.0 | → | → |
| H₂O/Al ratio | 0.40 | → | → | 0.40 | → | → | 0.40 | → | → |
| Al/Co ratio | 100 | → | → | 100 | → | → | 100 | → | → |
| Polymeriz. time | 30 min. | 60 min. | 90 min. | 30 min. | 60 min. | 90 min. | 30 min. | 60 min. | 90 min. |
| % Conversion | 54.2 | 61.1 | 65.7 | 47.8 | 60.2 | 67.6 | 41.8 | 53.3 | 57.5 |
| % Gel (millipore) | 0.019 | 0.039 | 0.039 | 0.009 | 0.019 | 0.019 | 0.049 | 0.039 | 0.069 |

| | Example No. | | | | | | | | |
|---|---|---|---|---|---|---|---|---|---|
| | 10 | 11 | 12 | 13 | 14 | 15 | 16 | 17 | 18 |
| Wet Butadiene (m Mole H₂O) | 14.2 g. (0.315) | → | → | 14.2 g. (0.315) | → | → | 14.2 g. (0.315) | → | → |
| Co octoate (m Mole) | 1.25 ml. (0.0079) | → | → | 1.25 ml. (0.0079) | → | → | 1.25 ml. (0.0079) | → | → |
| Alkyl Benzene | 0.25% p-xylene | → | → | 0.25% o-xylene | → | → | 0.25% m-xylene | → | → |
| Butadiene | 85.8 g. | → | → | 85.8 g. | → | → | 85.8 g. | → | → |
| Butene-1 | 100 g. | → | → | 100 g. | → | → | 100 g. | → | → |
| 1,5-COD$^{(1)}$ | 2.0 ml. | → | → | 2.0 ml. | → | → | 2.0 ml. | → | → |
| Cyclohexane | 234.0 g. | → | → | 234.0 g. | → | → | 234.0 g. | → | → |
| DEAC$^{(2)}$ (m Moles of Al) | 1.17 ml. (0.794) | → | → | 1.20 ml. (0.794) | → | → | 1.20 ml. (0.794) | → | → |
| Cl/Al ratio | 1.0 | → | → | 1.0 | → | → | 1.0 | → | → |
| H₂O/Al ratio | 0.40 | → | → | 0.40 | → | → | 0.40 | → | → |
| Al/Co ratio | 100 | → | → | 100 | → | → | 100 | → | → |
| Polymeriz. time | 30 min. | 60 min. | 90 min. | 30 min. | 60 min. | 90 min. | 30 min. | 60 min. | 90 min. |
| % Conversion | 21.1 | 48.9 | 56.4 | 12.9 | 34.8 | 46.2 | 11.0 | 34.4 | 43.6 |
| % Gel (millipore) | 0.079 | 0.039 | 0.043 | 0.039 | 0.019 | 0.019 | 0.079 | 0.000 | 0.000 |

| | Example No. | | | | | | | | |
|---|---|---|---|---|---|---|---|---|---|
| | 19 | 20 | 21 | 22 | 23 | 24 | 25 | 26 | 27 |
| Wet Butadiene (m Mole H₂O) | 14.2 g. (0.315) | → | → | 14.2 g. (0.329) | → | → | 16.5 g. (0.366) | → | → |
| Co octoate (m Mole) | 1.25 ml. (0.0079) | → | → | 1.70 ml. (0.0083) | → | → | 1.45 ml. (0.0093) | → | → |
| Alkyl Benzene | 0.25% xylene isomers | → | → | 0.34% xylene isomers | → | → | 0.25% Mesitylene | → | → |
| Butadiene | 85.8 g. | → | → | 85.1 g. | → | → | 83.5 g. | → | → |
| Butene-1 | 100 g. | → | → | 100 g. | → | → | 100 g. | → | → |
| 1,5-COD$^{(1)}$ | 2.0 ml. | → | → | 2.60 ml. | → | → | 2.60 ml. | → | → |
| Cyclohexane | 234.0 g. | → | → | 234.0 g. | → | → | 234.0 g. | → | → |
| DEAC$^{(2)}$ (m Moles of Al) | 1.20 ml. (0.794) | → | → | 1.70 ml. (0.821) | → | → | 1.35 ml. (0.915) | → | → |
| Cl/Al ratio | 1.0 | → | → | 1.0 | → | → | 1.0 | → | → |
| H₂O/Al ratio | 0.40 | → | → | 0.40 | → | → | 0.40 | → | → |
| Al/Co ratio | 100 | → | → | 100 | → | → | 100 | → | → |
| Polymeriz. time | 30 min. | 60 min. | 90 min. | 30 min. | 60 min. | 90 min. | 30 min. | 60 min. | 90 min. |
| % Conversion | 25.1 | 51.8 | 63.2 | 22.5 | 48.5 | 54.4 | 30.0 | 49.0 | 60.1 |
| % Gel (millipore) | 0.000 | 0.000 | 0.000 | 0.116 | 0.099 | 0.079 | 0.050 | 0.059 | 0.049 |

| | Example No. | | | | | |
|---|---|---|---|---|---|---|
| | 28 | 29 | 30 | 31 | 32 | 33 |
| Wet Butadiene (m Mole H₂O) | 16.5 g. (0.366) | → | → | 16.5 g. (0.366) | → | → |
| Co octoate (m Mole) | 1.45 ml. (0.0093) | → | → | 1.45 ml. (0.0093) | → | → |
| Alkyl Benzene | 0.29% Mesitylene | → | → | 0.29% Mesitylene | → | → |
| Butadiene | 83.5 g. | → | → | 83.5 g. | → | → |
| Butene-1 | 100 g. | → | → | 100 g. | → | → |
| 1,5-COD$^{(1)}$ | 2.60 g. | → | → | 2.60 ml. | → | → |
| Cyclohexane | 234.0 g. | → | → | 234.0 g. | → | → |
| DEAC$^{(2)}$ (m Moles of Al) | 1.85 ml. (0.915) | → | → | 1.85 ml. (0.915) | → | → |
| Cl/Al ratio | 1.0 | → | → | 1.0 | → | → |
| H₂O/Al ratio | 0.40 | → | →. | 0.40 | → | → |
| Al/Co ratio | 100 | → | → | 100 | → | → |
| Polymeriz. time | 30 min. | 60 min. | 90 min. | 30 min. | 60 min. | 90 min. |
| % Conversion | 22.2 | 42.1 | 43.8 | 27.2 | 46.6 | 56.7 |
| % Gel (millipore) | 0.089 | 0.059 | 0.129 | 0.089 | 0.069 | 0.049 |

$^{(1)}$1,5-COD is 1,5-cyclooctadiene
$^{(2)}$DEAC is diethyl aluminum chloride

Millipore Gel Content Determination

A 2 g. sample of cis-1,4-polybutadiene is weighed to the nearest tenth of a milligram, cut up into small pieces and placed in a 4 oz. (113.66 cc) bottle. 100 ml of a filtered toluene is added to the bottle which is then placed in a shaker for 2 to 4 hours until all the rubber is dissolved. The solution is then filtered under vacuum through a preweighed 47 mm, 8 micron, MF millipore filter disc. The bottle is flushed several times with toluene which is also filtered. Then the filter is placed in a small aluminum pan and dried in a vacuum oven at 150° C. for 30 minutes. The dried filter is weighed and percent gel is calculated according to the following formula:

$$\% \text{ gel} = \frac{\text{Final wt. of filter} - \text{Initial wt. of filter}}{\text{Wt. of sample}}$$

I claim:

1. An improved process of polymerizing butadiene-1,3 to produce primarily linear, gel-free cis-1,4-polybutadiene which is carried out in the presence of a catalyst comprising a cobalt compound, at least one organo-aluminum compound and water, the improvement which comprises carrying out the polymerization reaction in a cycloalkane having 5 to 8 carbon atoms containing 0 to 80 percent, based on the weight of cycloalkane, of a secondary solvent selected from the group consisting of a saturated aliphatic hydrocarbon and an α-monoolefin having 4 to 10 carbon atoms and from 0.1 to 2 percent, based on the weight of total solvent, of an alkyl substituted benzene having 1 to 4 alkyl substituents of 1 to 4 carbon atoms.

2. A process of claim 1 wherein the cycloalkane is cyclohexane.

3. A process of claim 1 wherein the alkyl substituted benzene has two or three methyl or ethyl groups.

4. A process of claim 3 wherein the cyclic aliphatic solvent is cyclohexane.

5. A process of claim 4 wherein the alkyl substituted benzene is o-, m-, or p-xylene, mesitylene diethylbenzene, or any mixture thereof.

6. A process of claim 4 wherein the ratio of aluminum to cobalt is in the range of from 50:1 to 300:1, and the ratio of water to aluminum is in the range of from 0.25:1 to 0.55:1.

7. A process of claim 6 wherein the alkyl substituted benzene is o-, m-, or p-xylene, mesitylene, 1,2-, 1,3- or 1,4-diethylbenzene, or any mixture thereof, employing additionally 20 to 50 percent of an α-monoolefin having 4 to 10 carbons as a secondary solvent and 0.1 to 2.0 percent of a non-conjugated dienes or a cyclic diene as a molecular weight modifier.

8. A process of claim 1 which comprises the steps of
   (a) dissolving a cobalt compound in wet butadiene-1,3 such that the aluminum to cobalt ratio is 50–800:1, the chlorine to aluminum ratio is 0.7–1.5:1 and the water to aluminum ratio is 0.1 to 0.8:1,
   (b) adding dry butadiene-1,3 to the wet butadiene which contains the pre-dissolved cobalt,
   (c) adding to the previous mixture solvent which contains 0.1 to 2.0 percent of an alkyl substituted benzene, 20 to 50 percent, based on the weight of cyclohexane, of an α-monoolefin having 4 to 10 carbon atoms and 0.1 to 2.0 percent, based on the weight of cyclohexane, of a non-conjugated diene or a cyclic diene,
   (d) adding to the above reaction mixture an organo-aluminum compound, and
   (e) polymerizing said butadiene-1,3 to a conversion of 30 to 90% thereby producing the substantially linear polymer.

9. A process of claim 8 wherein the solvent is a mixture of cyclohexane and butene-1, alkyl substituted benzene is o-, m-, or p-xylene, mesitylene, 1,2-, 1,3- or 1,4-diethylbenzene or any mixture thereof and the molecular weight modifier is 1,5-cyclooctadiene.

10. A process of claim 9 wherein the ratio of aluminum to cobalt is in the range of from 100:1 to 200:1, and the ratio of water to aluminum is in the range of from 0.20:1 to 0.55:1.

11. A process of claim 1 wherein the secondary solvent is an α-monoolefin which is used in the amount of from 20 to 50 percent.

12. A process of claim 1 employing additionally from 0.1 to 2.0 percent, based on the weight of total solvent, of a non-conjugated diene or a cyclic diene as a molecular weight modifier.

* * * * *